(12) United States Patent
Thirion

(10) Patent No.: US 11,094,139 B2
(45) Date of Patent: Aug. 17, 2021

(54) METHOD AND DEVICE TO SIMULATE, VISUALIZE AND COMPARE SURFACE MODELS

(71) Applicant: Jean Philippe Thirion, Valbonne (FR)

(72) Inventor: Jean Philippe Thirion, Valbonne (FR)

(73) Assignee: QuantifiCare S.A., Biot (FR)

( * ) Notice: Subject to any disclaimer, the term of this patent is extended or adjusted under 35 U.S.C. 154(b) by 0 days.

(21) Appl. No.: 16/449,865

(22) Filed: Jun. 24, 2019

(65) Prior Publication Data
US 2019/0392652 A1   Dec. 26, 2019

(30) Foreign Application Priority Data

Jun. 26, 2018 (FR) ...................................... 1870755

(51) Int. Cl.
*G06T 19/20* (2011.01)
*G06T 7/30* (2017.01)
*G06T 15/20* (2011.01)

(52) U.S. Cl.
CPC ............... *G06T 19/20* (2013.01); *G06T 7/30* (2017.01); *G06T 15/20* (2013.01); *G06T 2207/20221* (2013.01); *G06T 2207/30196* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 6,545,685 B1* | 4/2003 | Dorbie | .................. | G06F 3/1438 345/582 |
| 6,661,914 B2* | 12/2003 | Dufour | .................. | G06T 17/005 345/419 |
| 2005/0007584 A1* | 1/2005 | Mansfield | ............. | G01J 3/2823 356/301 |
| 2005/0093890 A1* | 5/2005 | Baudisch | .............. | G06T 15/503 345/639 |
| 2014/0132715 A1* | 5/2014 | Raghoebardayal | ..... | A63F 13/40 348/43 |

(Continued)

OTHER PUBLICATIONS

Cevidanes L H C et al: "Cranial base superimposition for 3-dimensional evaluation of soft-tissue changes", American Journal of Orthodontics and Dentofacial Orthopedics, Mosby, St. Louis, MO, US, vol. 137, No. 4, Apr. 1, 2010 (Apr, 1, 2010), pp. S120-S129 (Year: 2010).*

(Continued)

*Primary Examiner* — Steven Z Elbinger

(57) ABSTRACT

A method and device to simulate, visualize and compare 3D surfaces
Method and device to visualize a composition of two matched surface models (M1) and (M2) in order to privilege the visualization of the silhouette of the second representation (R2) of the second surface model (M2), that is, the surface elements which are the most tangent to the viewing direction defined by the optical center (C) of a virtual camera and the point (P) of the surface of the second surface model (M2) considered, and to visualize it by transparency on top of the first surface model (M1).
The disclosure is intended in particular to compare anatomical subjects before and after simulation or surgical or aesthetic procedures.

11 Claims, 4 Drawing Sheets

(56) References Cited

U.S. PATENT DOCUMENTS

| | | | | |
|---|---|---|---|---|
| 2017/0236250 A1* | 8/2017 | Kim | ................... | G06K 9/00288 |
| | | | | 382/190 |
| 2017/0236327 A1* | 8/2017 | Somasundaram | ...... | G06T 19/20 |
| | | | | 345/419 |
| 2018/0262745 A1* | 9/2018 | Cole | .................... | H04N 13/156 |
| 2019/0149792 A1* | 5/2019 | Luo | .......................... | H04N 9/76 |
| | | | | 348/571 |

OTHER PUBLICATIONS

Hummel et al.: "IRIS: illustrative Rendering for Intégral Surfaces", IEEE Transactions on Visualization and Computer Graphics, vol. 16, No. 6, Nov. 2010 (Nov. 1, 2010), pp. 1319-1328 (Year: 2010).*

* cited by examiner

METHOD AND DEVICE TO SIMULATE, VISUALIZE AND COMPARE SURFACE MODELS

BACKGROUND INFORMATION

The present invention relates to a method and a device for the visualization and the comparison of two surface models in three dimensions, representing the surfaces in two different conditions of the same subject. It is particularly relevant for the display and comparison of anatomical surfaces of the same subject.

Following and visualizing accurately the evolution of the surface of a patient is of particular interest to aesthetic doctors or plastic surgeons.

Techniques and devices have been developed to acquire in 3D series of surface models of a subject. The aim can be to compare measurements of the same subject acquired at different time points in order to evidence the effect of a treatment, as for example injection of hyaluronic acid used to increase sub-cutaneous volumes in the cheeks, nasolabial folds, lips, etc. as well as to simulate or evaluate the effect of placing a prosthesis, like in the case for breast implants. It can also be relative to a treatment intended to remove volume, as it is the case for liposuction or a non-surgical or surgical fat removal procedure. It can also apply to the comparison of before and after maxillo-facial surgery, rhinoplasty, or any other type of surgical, therapeutic or aesthetic procedures.

Same needs are existing for before-after comparison of virtual data obtained after simulation of such procedures, where one would be interested in comparing accurately the baseline surface with the result of the simulation of a surgical, therapeutic or aesthetic procedure.

When considering real before-after data, it may be necessary to use surface matching processing methods in order to superimpose in space the two successive surface models to be visualized and compared, while in the case of an original surface and a simulation, there is generally no need to match the two surfaces to be compared, as the simulated surface is obtained with a starting point which is the position of the initial baseline surface.

Some visualization methods are existing in order to compare a pair of 3D surface models or more of these. The simplest method consists in representing the two surfaces to be compared side by side using the graphic functionalities of a computer and to apply the same virtual geometric displacement in 3D between the two views presented side by side in a synchronized way.

Another method is to present alternatively one and the other of the two surfaces of this subject in the same display and to use the retinal persistence in order to appreciate differences.

Yet another method is to represent one of the two surfaces and, for each point of this surface, to color the surface with a color code representing the shortest distance between the two surfaces. Such technique, generally called "distance map", is enabling the evaluation of how close or how far the two surfaces are relative to one another, and for example, the color can be deep red when the second surface is very far above the first surface, close to white or green when the two surfaces are nearly tangent and deep blue when the second surface is far below the first surface. In that case, orientation of the normals of the surfaces are used to determine the inside-outside information necessary for coloring. Such display of distance maps can be found page 5 in K. Furmanova, Master's thesis, Masaryk University, Faculty of Informatics, Brno, Spring 2015. Another example can be found page 960 in Olivera-Santos et al.: "3D Face Reconstruction from 2D Pictures: First Results of a Web-Based Computer Aided System for Aesthetic Procedures", Annals of Biometrical Engineering, vol. 41, n.5, Jan. 15, 2013, pages 952-966.

At last, other systems are using transparency of one or the other of the two models in order to enable seeing one surface through the other. For these two surface models, both are generally rendered with a conventional rendering formula like Gouraud or Phong shading, which is sometime including the computation and exclusion of hidden parts, and rendered with transparency to compose a final representation, generally using a linear combination of the two and using the rendering capacities of the graphic cards of modern computers. An example of such display can be found in Cevidanes et al, "Cranial base superimposition for 3-dimensional evaluation of soft-tissue changes", American Journal of Orthodontics and Dentofacial Orthopedics, vol. 137, n. 4, April 2010, pages 120-129.

Although such transparency is enabling presenting the two surface models at the same time, it is sometime very difficult to distinguish what is corresponding to one or the other of the two surface models, the mix of opaque and transparent surfaces being too complex to enable clear interpretation of the differences between the two surfaces. Different methods based on transparency are explored in a systematic way by K. Furmanova (already cited). Transparency is used to represent the distance between the two surfaces, by displaying the overlaying surface in transparency, with obscuring values depending upon how far the two surfaces are one to the other at that point, pages 9-10. It is noted that opacity can be "modulated" by different functions depending upon surface orientation, but mostly, the longer the distance between the two surface and the opaquer the overlay. In this publication, color codes are also used in an attempt to disambiguate relative positions situation. But interpretation of these surfaces is still very complex, as can be seen from the numerous figures in this fairly recent publication.

The aim of the present disclosure is to solve these interpretation issues thanks to a representation which is close to transparency but which enables a much better visualization of the differences between the two surfaces, in particular at locations tangential to the two surface models, by simplifying the surface representation one of the two surface models to the extreme.

The present disclosure is privileging the representation of the silhouette of one of the two surface models, that is, parts of the model for which the surface is most tangent to the viewing direction. Visualization privileging silhouettes for better understanding of objects with complex shapes are presented for example in Hummel et al., "IRIS: illustrative Rendering for Integral Surfaces", IEEE Transactions on Visualization and Computer Graphics, vol. 16, n. 6, November 2010, pages 1319-1328. The method proposed in Hummel 2010 is intended for the representation of a single object with complex surface and not for the superimposition of two surfaces at two different timepoints of the same subject.

The present disclosure is producing a particularly visually pleasing representation enabling comparing very efficiently the relative positions of the two surface models in the direction where these surfaces are tangential to the point of view. When used in combination with the possibility to move, zoom and rotate the 3D models, this visualization enables to explore the surface differences in the different places of the subject, by changing the places where the surfaces are tangent to the point of view.

BRIEF SUMMARY OF THE INVENTION

The method and device being disclosed are intended for the visualization and comparison, in three dimensions, of a first surface model and at least one second surface model representing the surfaces of the same subject in two different states.

The second surface model can be a first surface model of an anatomical subject which has been deformed, for example by using a surgical operation simulation tool, in which case these two surface models are directly superimposable in space. It can also be a first surface model and a second surface model corresponding to 3D acquisitions of the subject performed at two different timepoints, in which case it may be necessary to apply a 3D matching algorithm in order to superimpose the two successive surface models as much as possible.

The method and device being disclosed is performing a first rendering of the first surface model in a classical way, using a virtual camera and virtual light sources, and a second rendering, more specific to the invention, of the second surface model, and then merge the two surface representations in a single comprehensive representation. For this invention, the second rendering is privileging the silhouette of the second surface model by emphasizing only parts of the surface which are tangential to the viewing direction of the virtual camera, for example using an intensity proportional to the difference between the angle between the viewing direction and the normal to the surface of the second surface model of the subject.

We can observe that it is not intuitive for a person having ordinary skill in the art to produce a rendering privileging the silhouette, as most rendering models used to visualize 3D surfaces are privileging augmenting the intensities of parts of the surface which are perpendicular to the viewing direction and not tangential to it, as it is the case in traditional rendering equations such as the Gouraud or the Phong rendering, for example.

Several different ways to calculate the intensity in the second rendering are proposed, one being to use one unit minus the absolute value of the cosine of the angle between the viewing direction and the normal to the surface of the second surface model. Several variations are also proposed in order to take into account and remove hidden parts in the second surface model as well as to eliminate surface elements with opposite orientation of their normal when compared with the viewing direction. Finally, several variations are proposed relative to the merge function used to merge the results of the two rendering functions, one being to use the intensity of the second rendering as a "transparency" coefficient, also called "alpha" coefficient, in order to use a uniform color for the second rendering modulated by alpha and merge it with the first rendering.

Some 3D visualization tools are proposed to enable the user to move these two surface models in order to observe the areas where the viewing direction is tangential to the subject, in order to better evaluate de differences in relative positions of these two surface models.

One of such visualization tools is including the possibility to visualize, side by side, on one side a representation of the first surface model rendered with the first rendering method and merged with the second surface model rendered with the second rendering method, and on the other side the second surface model rendered with the first rendering method and merged with the first surface model rendered with the second rendering method, in order to better evaluate the addition and subtraction of volumes between the two surface models.

It is understood that the same method is enabling the comparison of one or several surface models using a classical rendering merged with one or several surface models rendered with a rendering privileging the silhouettes.

The current disclosure is distinct from the state of the art which consists in merging with transparency two classical rendering display of two surface model as it is the case in Cevidanes et al., or displaying color distance maps as in Olivera-Santos et al. It is counter-intuitive as it is not using the same rendering model for each of the two surfaces, but on the contrary is privileging the silhouette of one of the two surface models. It is not using a transparency algorithm obscuring or changing surface colors depending upon the distances between the two surfaces like in Furmanova. On the contrary, the second surface representation, which is used for visualization is removed from most of the surface details, in a way close to the surface representations presented in Hummel et al. for single complex surfaces, but is going much further in simplification, concentrating upon the representation of the sole silhouette of the second surface model in order not to prevent mis-interpretation of the surfaces, but to display the differences between the two surfaces in the sole positions were surfaces are nearly tangent to the relative viewing directions, improving much the state of the art relative to visual comparison of two surface representations of the same subject.

Finally, the disclosure is not an abstraction because it relies on numerical representation of three-dimensional surfaces obtained via measurements and/or simulation from a real subject, and that such numerical representation can encompass thousands, or even millions of surface units, which is exceeding by far the accuracy and capacity of the human skill is representing an anatomical shape via drawing or painting. The invention aims at improving the visualization and comparison of 3D surfaces of anatomical subjects.

DETAILED DESCRIPTION OF THE INVENTION

The disclosed method is taking as input a first surface model (M1) and at least a second surface model (M2) of the same subject (S) in order to compare their shapes. A first conventional rendering method (R1) is used to produce a first image (I1) representing the surface model (M1) by means of a virtual camera which is including in its definition its optical center (C), as presented in figure FIG. 1.

Figure 3:
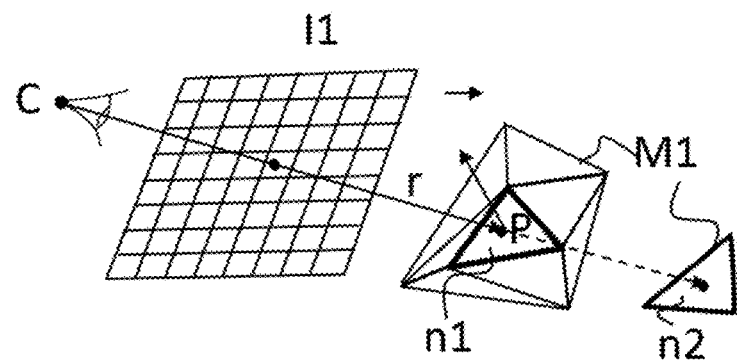
FIG. 3 is presenting a method to compute and remove hidden parts based on a "z-buffer" or a ray tracing.

This first conventional rendering method can include the computation and removal of hidden parts via an algorithm illustrated in figure FIG. 3, which can be a "z-buffer", also called "depth-buffer", as described in Haas et al. in U.S. Pat. No. 6,222,551 of Apr. 24, 2001, where all the surface elements composing the first surface model (M1)—generally triangles—are projected on a regular grid, i.e. the image (I1) and is storing the reference number of the projected surface element (n1) as well as its distance to the optical center (C) for each node of the grid. In case two surface elements are projecting onto the same grid node, only the distance and reference number of the element the closest to the virtual camera optical center (C) is retained.

Another hidden parts algorithm, also presented in figure FIG. 3 is the "ray tracing" technique, where the first intersection of a ray (r) starting from the optical center (C) of the virtual camera and going through the grid node of the image (I1) is propagating up to its first encounter with a surface element of the surface model (M1).

The first conventional rendering method (R1) is including also a rendering model to compute the image intensity (i1), such as the Gouraud lighting model as described in Gouraud H. et al., "Continuous Shading of Curved Surfaces", IEEE Transactions on Computers, vol. C-20, N° 6, June 1971, pp. 87-93. It can also be the Phong lighting model, as described in Bui Tuong Phong, "Illumination for Computer Generated Pictures", Graphics and Image Processing, Communications of the ACM, vol. 18, N° 6, June 1975, pp. 311-317, or any other equivalent lighting models.

These types of rendering are producing for each point (P) in the image (I1) a final color, generally represented by its 3 color channels Red, Green and Blue (RGB), taking into account the albedo of the object, the position and orientation of virtual light sources, the considered point (P) of the surface, the normal to the surface and the direction and distance between the optical center (C) of the virtual camera and the point (P) of the surface under consideration.

Figure 4:
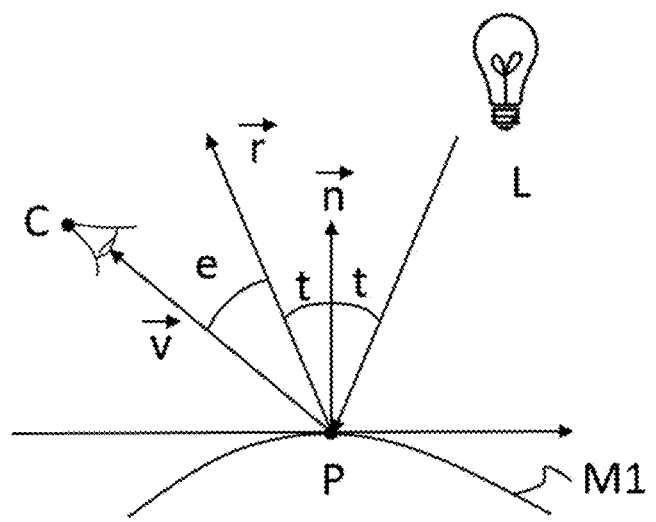
FIG. 4 is presenting the "Phong" rendering model.

FIG. 4. Is illustrating the computation of the Phong light model in a point P of the surface of the first surface model (M). It is corresponding to the sum of three elements, operating over the three color channels red, green and blue. The first element is relative to virtual lights, and composed with an ambient light and the multiplication of the light intensity of a virtual light (L), the albedo of the surface and a reflection coefficient specific to the surface "material". The second term is composed with the multiplication of a diffuse reflection coefficient, the albedo of the surface, the light intensity of the virtual (L) and the cosine of the angle (t) between the surface normal (n) and the direction of the virtual light (L) represented by its reflection (r). The third term is the product of a specular reflection coefficient, the albedo of the surface, the light intensity of the virtual lamp (L), the cosine of the angle (A) between the direction linking the point (P) and the optics center (C) of the virtual camera, and the ray (r) being the reflection of the direction of the virtual light (L) relative to the normal (n) of the first surface model (M1) at point (P), this cosine being raised to the power (s) called "shininess" of the subject.

The first rendering method (R1) can of course be more evolved in order to provide even more realistic image representations using for example normal maps to render very small details of the surface, and/or using texture maps in order to display the skin texture of a real subject. It can be augmented by methods such as sub-surface scattering effects.

Figure 1:
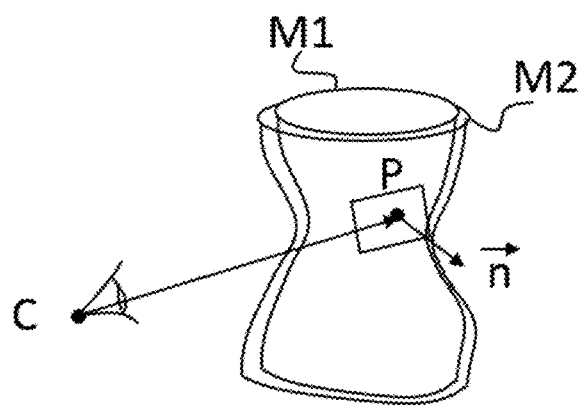
FIG. 1 is presenting the superimposition of two surface models of the same subject, along with the viewing direction.
Figure 2:
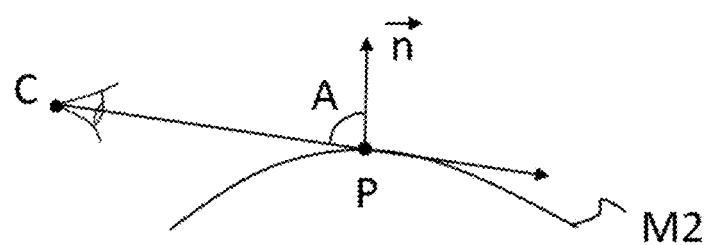
FIG. 2 is presenting the angle between the viewing direction and the normal to the second surface model.

The method disclosed is including a second, more specific rendering method, priviledging the silhouette of the second surface model (M2) and illustrated in figures FIG. 1 and FIG. 2. The method disclosed is computing for a point (P) of the second surface model (M2) the angle (A) between the viewing direction (CP) defined by the center (C) of the optics of the virtual camera and the point (P), and the normal (n) to the surface at point (P). The disclosed method is then determining a second intensity (i2) for a second image (I2) representing the surface model (M2), for which the intensity (i2) is all the more increased than the angle (A) is close to a right angle.

In a specific variation of the method disclosed, the second image intensity (i2) can be one unit minus the absolute value of the cosine of the angle (A): $i2=1-|\cos(A)|$, but other functions increasing as the angle is increased can also be used, such as a quadratic formula $i2=(1-|\cos(A)|)^2$, or raising the formula to a given power: $i2=(1-|\cos(A)|)^x$, or any such increasing function of the angle reaching its maximum for a right angle.

A merging function (MER) is used to merge the first intensity (i1) obtained with the first rendering method (R1) applied to the first model (M1) and the second intensity (i2) obtained with the second rendering method (R2) applied to the second model (M2) and (i2). The merging function (MER) can be a linear combination of the color intensities obtained by the two rendering methods.

A particularly relevant variation of the invention consists in considering the second intensity (i2) as a transparency index "alpha", and use this alpha index value to weight the first intensity (i1) possibly represented by its three color channels values red (R1), green (G1) and blue (V1) and a constant reference intensity (iC), also possibly represented by its three color channels values (Rc), (Gc), and (Bc). It is then interesting to use for composition one unit minus alpha (1-alpha) as a weight for the first intensity (i1) and alpha as a weight for the constant intensity (iC).

In that later variation, formulae for the computation of the final intensity (R,G,B) in the comprehensive representation (R12) of the final image can be:

$$R=(1-\text{alpha})\times R1+\text{alpha}\times Rc$$

$$G=(1-\text{alpha})\times G1+\text{alpha}\times Gc$$

$$B=(1-\text{alpha})\times B1+\text{alpha}\times Bc$$

In order to visually simplify the final comprehensive representation (R12), an interesting variation of the disclosed method is to suppress in the second representation (R2) the surface elements of the second model (M2) whose normal direction is in the same orientation than the viewing direction (CP), using only surface elements with a positive dot product of the two: CP.n>0.

A variation of the disclosed method can include a further visual simplification of the second representation (R2) of the surface elements of the second surface model (M2) by keeping for each grid node of the corresponding image (I2) only the surface element the closest to the optical center (C) of the virtual camera.

In this variation, a hidden part algorithm can be used, as it is the case for conventional rendering methods, such as a "z-buffer" or "ray tracing". It can also be interesting to compute an "item buffer" which is providing for each grid node of the second image (I2) the reference number of the surface element of the second surface model (M2) which is the closest to the optical center (C) of the virtual camera, and finally use this reference number to identify the surface element and compute the second intensity value (i2) of the image (I2) of the second rendering method (R2) for this point in the image.

Figure 5:
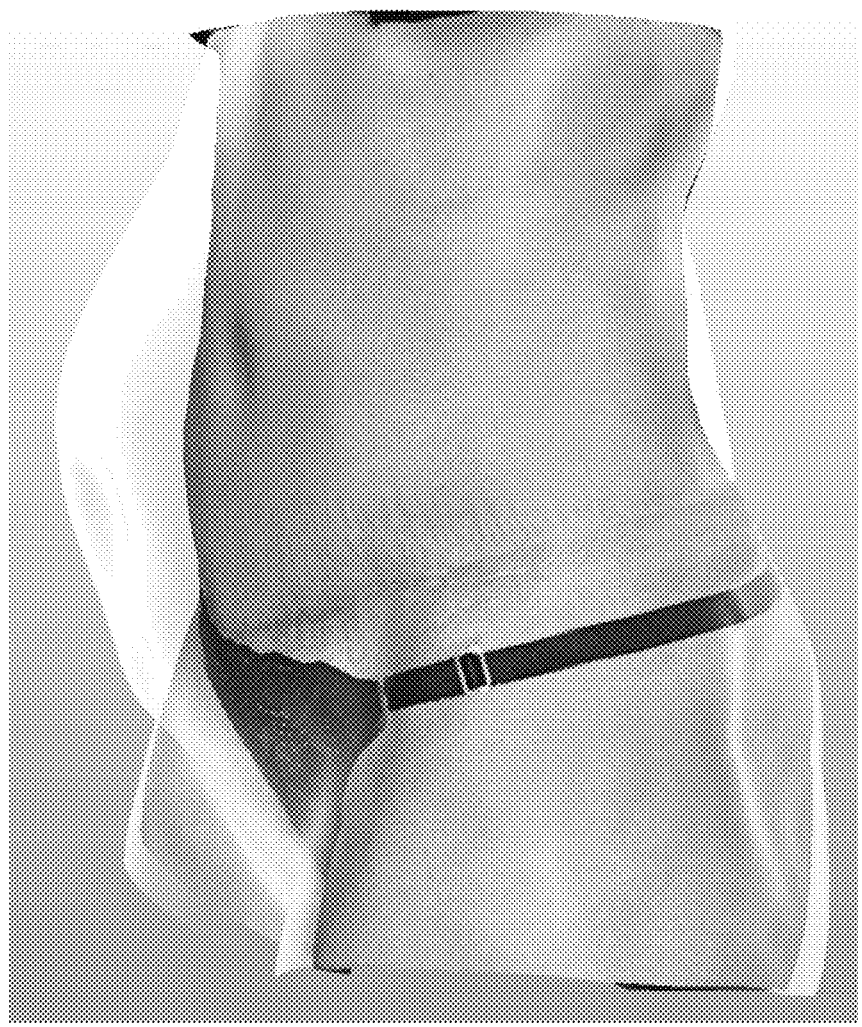
FIG. 5 is presenting the comprehensive rendering (in gray levels) composed of two surface models implementing the method disclosed for the same real subject before and after an actual surgical fat removal procedure (abdominoplasty).

FIG. 5 is presenting an example of a gray level image corresponding to a representation according to the disclosed method of the comprehensive representation (R12) of a first surface model (M1) and a second surface model (M2) acquired before and after a surgical operation called "abdominoplastie" in a real patient.

These two surface models (M1) and (M2) have been matched in 3D in order for the two surfaces to be as close as possible one to the other, using a technique known as "Iterative Closest Point" (ICP). The final comprehensive representation (R12) has been obtained by using a Phong rendering for the first surface model (M1) as well as the real texture of the patient associated to this first surface model (M1) and by using as a second rendering method (R2) for the second surface model (M2) the formulae making use of one minus the absolute cosine of the angle between viewing direction and surface normal. The surface elements with normals oriented into the same orientation than the viewing direction in surface model (M2) have been removed, as well as hidden parts using a z-buffer algorithm.

The merging formula used (MER) is using the image intensity (i2) of the second image (I2) obtained with the second rendering method (R2) as a transparency coefficient alpha to compose the colors obtained for the first representation (R1), (G1), (B1) weighted by one unit minus alpha, and a uniform white color (Rc=1), (Vc=1) and (Bc=1) weighted by alpha.

In order to present the final result with gray levels instead of colors in FIG. 5, the average of the three-color channels is used: (R+G+B)/3, but solely for the needs of a black and white publication.

Figure 6:
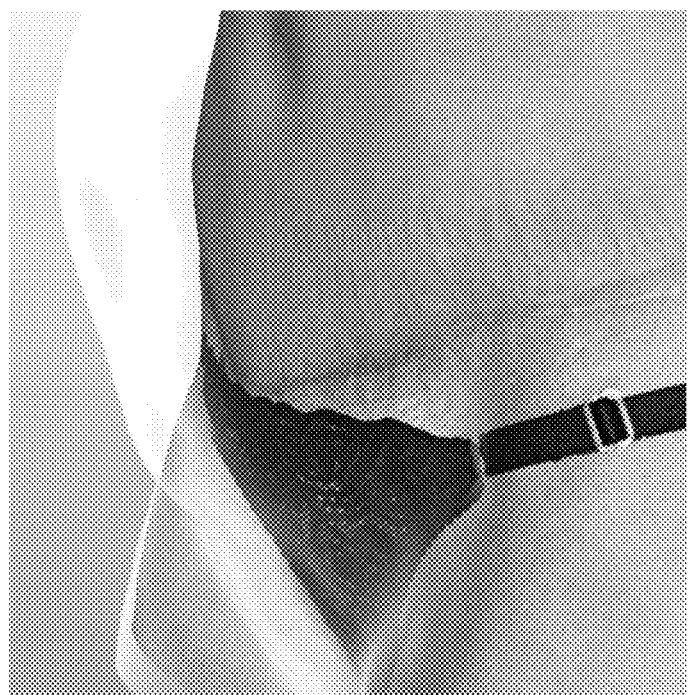
FIG. 6 is presenting a detailed view of the image of FIG. 5 in order to better evaluate the perception of the different relative positions of the two surfaces.

FIG. 6. is presenting a detailed view of FIG. 5 in order to better evaluate the simplicity of the representation and how the difference between the two surfaces of the subject, before and after surgical operation, can be perceived. We can better assess the absence of the surface elements of the second model (M2) which are oriented with a normal with same orientation than the view direction, as well as the absence of hidden parts in the second model relative to the optical center (C) of the virtual camera.

Figure 7:
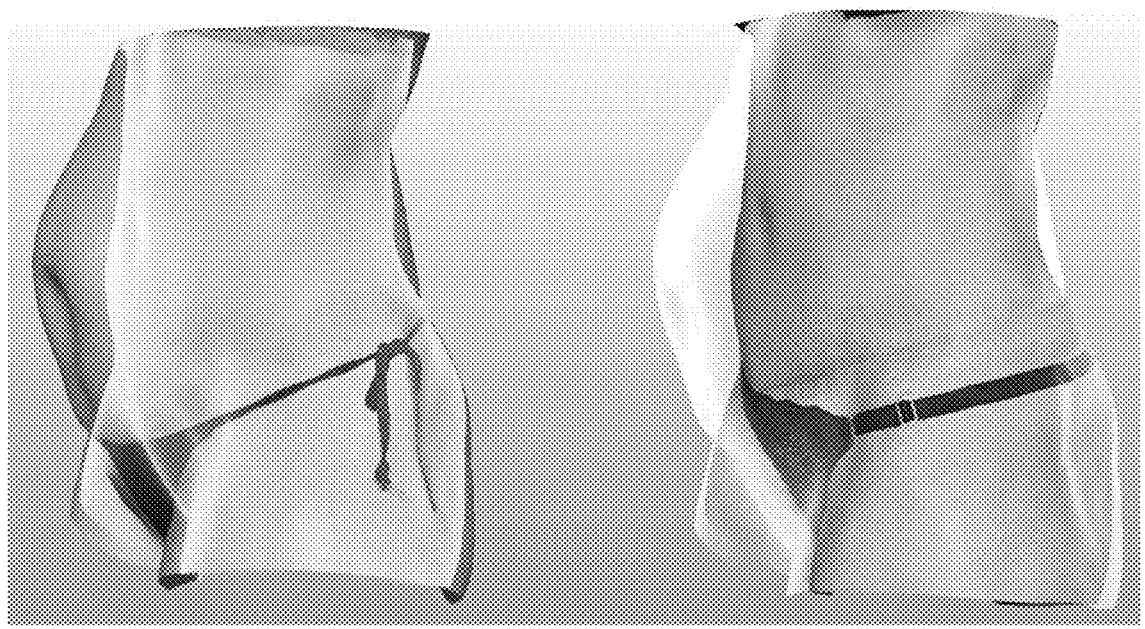
FIG. 7 is presenting a variation of the method with a side by side representation of each time the two surfaces with, on the left, the silhouette of the "after" overlaid on the "before" and on the right, the silhouette of the "before" overlaid on the "after".

FIG. 7. is presenting a double-representation of both surface models of the before and after of the real patient. In the left image representation, the first rendering method (R1) is applied to the second surface model (M2) (i.e. after operation) and the second rendering method (R2) has been applied to the first surface model (M2) (i.e. before operation), while in the right image representation, the first rendering method (R1) has been applied to the first surface model (M1) (i.e. before operation) while the second rendering method (R2) has been applied to the second surface model (M2) (i.e. after operation).

What cannot be seen in FIG. 7, but is an interesting variation of the disclosed method is the possibility to rotate, zoom and move both representations at the same time, synchronized between left and right images, in order to explore visually all the differences before and after operations by manipulating these synchronized models in 3D.

The current disclosure is also relative to a device implementing the disclosed method in order for a user to acquire in 3D and visualize at least two surface models of the same subjects in order to study their differences. This device is comprising:

3D surface acquisition means of an anatomical subject (S).

3D graphical visualization means to display the comprehensive representation (R12) of the two surface models (M1) and (M2) and including the possibility to rotate, displace and/or zoom in 3D the comprehensive representation (R12) of the merge (MER) of the rendering (R1) and (R2) of the surface models (M1) and (M2).

The 3D surface acquisition means can be a 3D stereophotogrammetry camera system as it is presented by Thirion et al. in U.S. Pat. No. 9,621,875 of Apr. 11, 2017, comprising a double optics enabling the acquisition of a stereo pair of images acquired with different angles. Active 3D acquisition methods can also be used, potentially including structured light source projected on the surface of the scanned subject, such projected light being potentially infra-red light, to generate depth maps. Numerous 3D reconstruction devices are existing enabling reconstruction in 3D of the surface of subjects, including or not surface texture maps, and can be used by the method and device of the current method.

Computation means used by these 3D stereo systems to reconstruct surface representation in 3D are generally producing a representation of the surface by means of triangles, but other 3D representations can be used: quadrangles, polygons, splines, parametrical representations, all being possibly used in the current disclosure.

A variation of the disclosed device is comprising computation means to simulate the deformation of surfaces, such as deformations simulating surgical operations and enabling computing a second surface model (M2) from the first surface model (M1) and hence being automatically superimposed to the first surface model (M1).

Another variation of the disclosed device is including computation means to match the two surfaces (M1) and (M2) in 3D, in order to provide a representation where these two surface models (M1) and (M2) are presented as close as possible one to the other.

Computation means are generally provided via a programmable computer, but it can also be a smart phone, a tablet, a server or any other computation mean, equipped with any type of graphic display.

Amongst the different existing algorithms to match surfaces in 3D, the "Iterative Closest Point" (ICP) method is particularly useful, alternating between finding corresponding points between the two surfaces, computing the transformation minimizing the distances between matched points (such as a "least square" minimization), applying found transformation to one of the two models to bring it closer to the other one and iterating this process. Other surface matching techniques can be used to minimize the distances between the two surface models, which can include or not the texture associate to these surfaces, the extraction of anatomical landmarks or of geometric invariants such as the principal curvatures as presented by Thirion et al. in U.S. Pat. No. 5,499,322 of Mar. 12, 1996.

The visualization means to display the comprehensive representation (R12) by using virtual cameras can include graphic cards operating graphic display protocols such as "OpenGL" or "Direct X". These graphic standards and graphic cards are generally including the management of a special channel called "alpha channel" which enable to compose in real time two image representations and implement the variation of the method making use of the one minus alpha and alpha weights to compose the two image representations (R1) and (R2) into a single one (R12).

The method and device according to the disclosure are specifically intended to visualize and compare two surface models (M1) and (M2) of the same subject in two different situations in order to better appreciate the relative differences in the position of the two surfaces. It is best intended to plan surgical procedures by displaying surgery simulation alternatives or to control the efficacy of real procedures by comparing surfaces of real patients before and after surgical or aesthetic procedures.

What is claimed is:

1. A method to represent via a virtual camera (C) at least two surface models (M1) and (M2) in three dimensions, corresponding to surfaces of a subject (S) wherein:
    a first surface model (M1) is represented via a first rendering method (R1), and
    a second surface model (M2) is represented via a second rendering method (R2) privileging for its intensity parts of the second surface model (M2) whose surface normals are perpendicular to the viewing direction, and
    the first and second rendered surface models (R1) and (R2) are merged using a merging function (MER) in order to provide a comprehensive representation (R12) with a single image of the two surface models (M1) and (M2) and
        the merging function (MER) is merging, for a point (P) of the comprehensive representation (R12), a first intensity (I1) obtained by applying the first rendering (R1) to the first surface model (M1) and a second intensity (I2) obtained by applying the second rendering (R2) to the second surface model (M2), such that if alpha is a normalization of the second intensity (I2) then the final rendering at that point (P) is one unit minus alpha, multiplied by the first intensity (I1), to which it is added a fixed color value multiplied by alpha, this fixed color value being possibly white and
    the intensity produced by the second rendering method (R2) is proportional to the difference between one unit and the absolute value of the cosine of the angle between the direction of a surface normal (N) at a point (P) of the second surface model (M2) and the viewing direction (CP) going from the center of the optics of the virtual camera (C) and toward the point (P) of the surface of the second model (M2).

2. The method according to claim 1 wherein a 3D surface matching method is applied to determine a geometric transformation in three dimensions between the at least two surface models (M1) and (M2) and the geometric transformation is applied to one of the at least two surface models to make it as close as possible to another.

3. The method according to claim 1, wherein the second rendering method (R2) is such that the second rendering method (R2) is all the more intense that a normal (N) at a point (P) of the surface of the second model (M2) is perpendicular to the viewing direction (CP) going from the center of the optics of the virtual camera (C) and toward the point (P) of the surface of the second model (M2), and conversely, is such that the second rendering method (R2) is all the less intense that the normal (N) at a point (P) of the surface of the second model (M2) is parallel to the direction of the viewing direction (CP) going from the center of the optics of the virtual camera (C) and toward the point (P) of the surface of the second model (M2).

4. The method according to claim 1, wherein the merging function (MER) is merging a first intensity (I1) obtained by applying the first rendering (R1) to the first surface model (M1) and a second intensity (I2) obtained by applying the second rendering (R2) to the second surface model (M2) via a linear combination of the two intensities (I1) and (I2).

5. The method according to claim 1, wherein the second rendering method (R2) discards rendered surface elements of the second surface model (M2) whose surface normal (N) is oriented in the same orientation that the viewing direction starting from the optics center of the virtual camera (C) and going through a point (P) of the considered surface element of the second surface model (M2).

6. The method according to claim 1, wherein the second rendering method (R2) is using an item buffer in order to discard for rendering any second point (P') of the second surface model (M2) for which it exists another first point (P) of the second surface model (M2) being closer to the optic center of the virtual camera (C) than the second point (P').

7. The method according to claim 1, wherein at least two comprehensive representations (R12) and (R21) of the at least two surface models (M1) and (M2) of the same subject (S) are presented side by side, such that the first of the two comprehensive representations (R12) is corresponding to a first merger (MER1) of the intensities produced by a first rendering method (R1) applied to the first surface model (M1) and a second rendering method (R2) applied to the second surface model (M2), and the second of the two comprehensive representations (R21) is corresponding to a second merger (MER2) of the intensities produced by the first rendering method (R1) applied to the second surface model (M2) and the second rendering method (R2) applied to the first surface model (M1).

8. The method according to claim 7, wherein when the virtual camera (C) used in the first of the two comprehensive representations (R12) is moved, the same relative displacement of the virtual camera (C) in the second of the two comprehensive representations (R21) is moved accordingly, so that the same viewing directions are used between the two comprehensive representations (R12) and (R21) which are presented side by side.

9. A device implementing a method to represent via a virtual camera (C) at least two surface models (M1) and (M2) in three dimensions, corresponding to surfaces of a subject (S) wherein:
    a first surface model (M1) is represented via a first conventional rendering method (R1), and
    a second surface model (M2) is represented via a second rendering method (R2) privileging for its intensity parts of the second surface model (M2) whose surface normals are perpendicular to the viewing direction, and
    the first and second rendered surface models (R1) and (R2) are merged using a merging function (MER) in order to provide a comprehensive representation (R12) with a single image of the two surface models (M1) and (M2) and
        the merging function (MER) is merging, for a point (P) of the comprehensive representation (R12), a first intensity (I1) obtained by applying the first rendering (R1) to the first surface model (M1) and a second intensity (I2) obtained by applying the second rendering (R2) to the second surface model (M2), such that if alpha is a normalization of the second intensity (I2) then the final rendering at that point (P) is one unit minus alpha, multiplied by the first intensity (I1), to which it is added a fixed color value multiplied by alpha, this fixed color value being possibly white and
    the intensity produced by the second rendering method (R2) is proportional to the difference between one unit and the absolute value of the cosine of the angle between the direction of a surface normal (N) at a point (P) of the second surface model (M2) and the viewing direction (CP) going from the center of the optics of the virtual camera (C) and toward the point (P) of the surface of the second model (M2), and the device comprising further:

- A system to acquire in three dimensions at least one surface representation of a subject (S), and,
- An image visualization system to display a comprehensive representation (R12) of at least two surface models (M1) and (M2) acquired with a three-dimensional surface acquisition system, wherein the image visualization system is configured to visualize and virtually move, zoom and/or rotate in 3D the comprehensive representation (R12) of a merge (MEL) of a first rendering (R1) of a first surface model (M1) and a second rendering (R2) of a second surface model (M2).

10. The device of claim 9, comprising computation means enabling creating a second surface model (M2) by deforming a first surface model (M1) using 3D virtual deformation tools, wherein the image visualization system is presenting the comprehensive representation (R12) of the merger (MEL) of the first rendering (R1) of first surface model (M1) and of the second rendering (R2) of the second surface model (M2) obtained by deforming the first surface model (M1) using the 3D virtual deformation tools.

11. The device of claim 9, comprising computation means enabling the computation of a relative displacement between the surface of the first model (M1) and the surface of the second model (M2) and applying the transformation corresponding to this relative displacement to one of the two surface models in order to display a comprehensive representation (R12) of the two surface models (M1) and (M2) so that these two surface models are as close as possible one to the other.

* * * * *